June 7, 1966 N. R. BROWNYER ETAL 3,254,742
TORQUE RESPONSIVE BRAKE SYSTEM
Filed Aug. 15, 1963 2 Sheets-Sheet 2

INVENTORS
Nelson R. Brownyer
James C. Cumming
BY
Strauch, Nolan & Neale
ATTORNEYS

United States Patent Office 3,254,742
Patented June 7, 1966

3,254,742
TORQUE RESPONSIVE BRAKE SYSTEM
Nelson R. Brownyer, Birmingham, and James C. Cumming, Pleasant Ridge, Mich., assignors, by mesne assignments, to Rockwell-Standard Corporation, a corporation of Delaware
Filed Aug. 15, 1963, Ser. No. 302,389
7 Claims. (Cl. 188—152)

This application is a continuation-in-part of Ser. No. 296,194 filed July 19, 1963, now abandoned.

The present invention relates to automotive brake systems of the type in which the force to actuate the brakes for certain of the vehicle wheels is derived solely from the torque produced in brake means disposed within one or more of the other wheels.

Brake systems of this general type are disclosed and claimed in application Ser. No. 241,265 filed Nov. 30, 1962, for Brake Systems.

Generally these systems comprise a primary hydraulic system actuated in the usual manner by a master cylinder to operate the brakes associated with one or more of the vehicle wheels, preferably the wheels having the lightest load. The system also includes a secondary system comprising a power cylinder and the actuators for the brakes of the other wheels. When the primary system is pressurized to move the brake shoes into contact with the drums, at least the primary shoe is moved in the direction of rotation of the drum. This movement urges the leading end of the primary shoe into a power cylinder to develop a pressure therein which is communicated to the secondary system and thus to the actuators for the remaining brakes. For a more detailed description of the structure and function of such a system reference may be had to the aforesaid application Ser. No. 241,265.

When the leading end of the primary shoe is moved into the power cylinder by the action of the rotating drum the trailing end of the shoe tends to move away from the actuator cylinder a distance beyond that which it would normally be moved by the action of the actuator piston. This requires the use of more fluid which is undesirable.

It is, accordingly, a primary purpose and object of the present invention to provide an improved torque actuated power braking system including novel means for utilizing the movement of the primary brake shoes associated with one or more of the wheels to actuate the brakes in the remaining wheels while maintaining the full efficiency of the primary brakes.

It is a further object of the present invention to provide, in a torque actuated power braking system, a mechanical movement transfer means for the power actuated brake to maintain a constant fluid volume in the actuator of the primary brake system.

It is also an object of the present invention to provide a novel mechanical connection between the primary and secondary brake shoes in a torque reaction power braking system to positively maintain the primary and secondary brake shoes in predetermined circumferential relation.

It is another object of the present invention to provide, in a torque reaction brake system, a pair of mechanical connections between the primary and secondary brake shoes to maintain them in predetermined spaced relation when in brake released position and to maintain the shoes in predetermined circumferential relation when the brakes are applied.

Additional objects and advantages will become apparent as the description proceeds in connection with the accompanying drawings in which:

FIGURE 3 is an enlarged fragmentary view, partly in section, illustrating another embodiment of a power cylinder for the secondary braking system constructed in accordance with the present invention.

Figure 1:
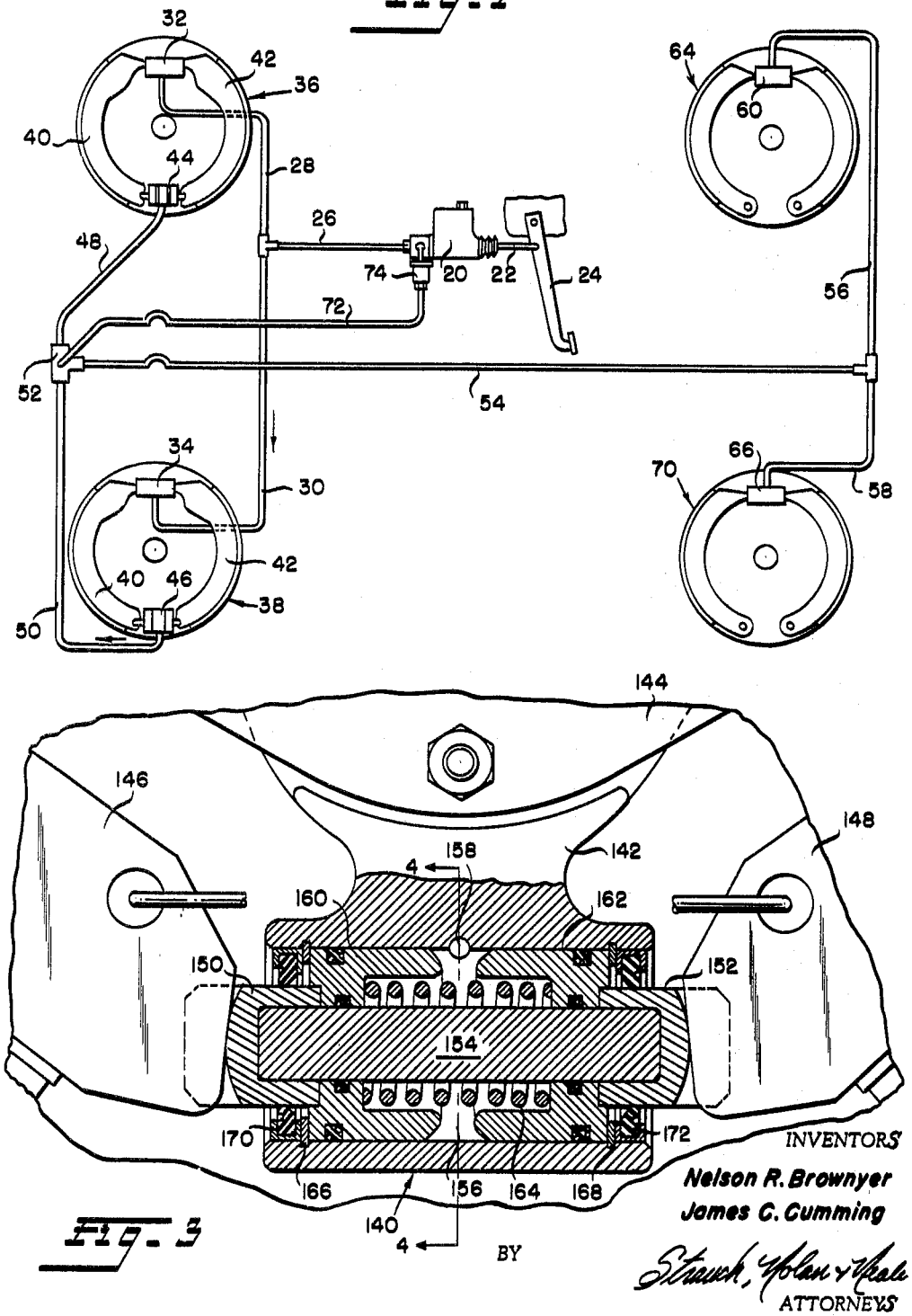
FIGURE 1 is a diagrammatic representation of a vehicle braking system incorporating the present invention.

Referring now more particularly to the drawings the vehicle hydraulic power braking system shown in FIGURE 1 comprises a master cylinder 20 having an actuating rod 22 connected to a brake pedal 24. The primary pressure conduit 26 leading from the master cylinder 20 is connected by branch conduits 28 and 30 to the actuators 32 and 34 of the primary wheel brake assemblies 36 and 38 which are here mounted on the opposite ends of the forwardly disposed axle, not shown, which may be in the front axle of a four wheel tractor of the type usually coupled to a trailer. The brake assemblies are surrounded by conventional drums (not shown) rotatably mounted on the ends of the axle.

The brake assemblies 36 and 38 comprise opposed brake shoes 40 and 42 connected at one end to the actuators 32 and 34 and connected at their opposite ends to power cylinders 44 and 46 which energize the secondary brake system described in detail below. The power cylinders 44 and 46 are connected by conduits 48 and 50 to a T-fitting 52 connected by a conduit 54 and branch conduits 56 and 58 to actuator 60 associated with the rear brake assembly 64 and actuator 66 connected with the rear brake assembly 70. The rear brake assemblies 64 and 70 are of the form shown in U.S. Patent No. 2,751,048 and accordingly will not be described further here.

The power cylinders 44 and 46, the conduits 48, 50, 54, 56 and 58 and the associated actuators 60 and 66 may be termed the secondary brake system. This system is essentially independent from the primary system which includes the master cylinder 20, the conduits 26, 28 and 30 and the actuators 32 and 34. However, in order to automatically replenish the supply of fluid in the secondary system or to relieve excess pressure from heat expansion in the secondary system, it is connected through a conduit 72 and a check valve 74 to the master cylinder 20. The valve 74 is preferably of the type disclosed in application Ser. No. 292,559 filed July 3, 1963, for Brake System.

The actuators 32 and 34 of the primary brakes are preferably of the type shown in U.S. Patent No. 3,057,-439. Briefly, these actuators comprise a housing 76 attached to or formed integrally with a brake spider 78. The housing 76 contains a pair of opposed pistons 80 and 82 which bear against the respective brake shoes 40 and 42 and are adapted to be urged apart by fluid pressure applied to pressure chamber 81 through conduits 28 or 30. The action of the return spring is modified by an automatic adjustment mechanism 83 which automatically increases the spacing between the brake shoes in their released position to compensate for wear as more fully disclosed in Patent No. 3,057,439.

Figure 2:
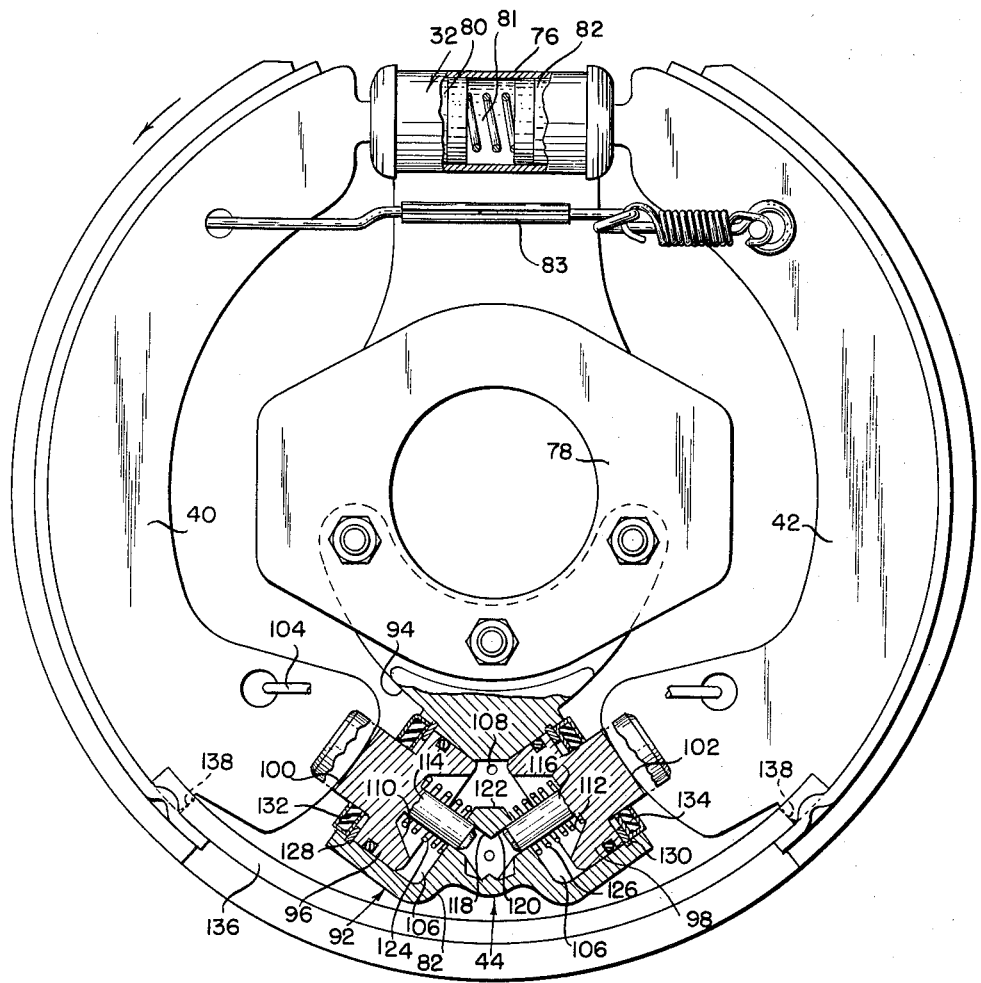
FIGURE 2 is an enlarged elevation of one of the brakes incorporating an actuator of the primary system and a power cylinder for energizing the secondary system.
Figure 4:
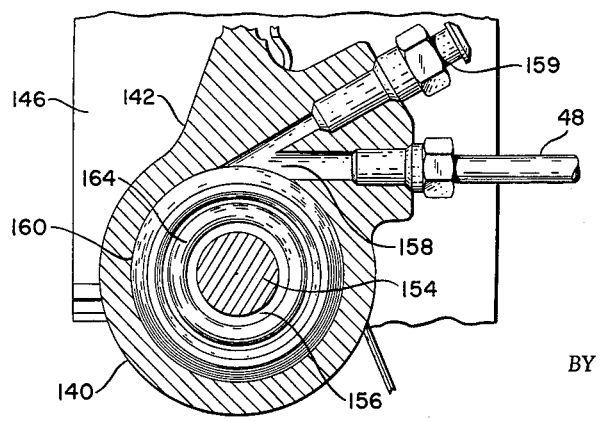
FIGURE 4 is a section along line 4—4 of FIGURE 3.

The power cylinders 44 and 46, which actuate the secondary system, are of identical construction and may be of the form shown in FIGURE 2 or the form shown in FIGURES 3 and 4. The power cylinder assembly shown in FIGURE 2 is carried by a housing 92 attached by a flange 94 to the brake spider 78. The housing 92 slidably receives a pair of pistons 96 and 98 which, because of the particular shape of the brake shoes are angularly disposed. This disposition of the pistons 96 and 98 does not affect the operation of the mechanism.

Slots 100 and 102 on the outer ends of the pistons 96 and 98 are provided to receive the ends of the brake shoes 40 and 42, respectively. The brake shoes are held in the slots by the usual return spring 104.

The pistons 96 and 98 extend into a compression chamber 106 which has an outlet 108 connected to the secondary brake conduits 48 and 50. The pistons 96 and 98 are provided with axial recesses 110 and 112 from which small diameter guide stems 114 and 116 extend which are adapted to slide in oppositely inclined bores 118 and 120, respectively, of a boss 122 in chamber 106. Coil springs 124 and 126 normally bias the pistons 96 and 98 outwardly against lock rings 128 and 130, respectively, at the outer ends of the piston bores. Seals 132 and 134 prevent any moisture and dust from entering the piston bores.

In operation, assuming that the vehicle is moving forward and the wheels are accordingly rotating in a counterclockwise direction as viewed in FIGURE 2, the brakes may be applied by depression of the brake pedal 24 to pressurize the primary system to supply hydraulic fluid under pressure through conduits 26, 28 and 30 to the respective pressure chambers 81 of the actuators 32 and 34 spreading the pistons 80 and 82 apart to urge the brake shoes 40 and 42 into contact with the rotating drum. Upon engagement of the brake shoes with the drum the primary brake shoe 40 tends to move in the direction of the drum. This movement forces the piston 110 inwardly of the pressure chamber 106. Since the piston 98 is held against outward movement there is a net reduction in the volume of the chamber 106 thus placing the fluid therein under pressure which is communicated through the secondary system conduits 48, 50, 54, 56, and 58 to the actuators 60 and 66 of the brakes 64 and 70 to apply these brakes. Since the columns of hydraulic fluid in both the primary and secondary systems are initially full and solid when the front and rear sets of brake shoes frictionally engage their respective drums the increasing pressure applies all brakes simultaneously. The tendency of the secondary brake shoe 42 to move in the direction of rotation of the drum is much less than the tendency of the primary shoe to move in this direction. Accordingly, in prior constructions the movement of the primary shoe away from the main actuator 32 causes the piston 80 to float towards its shoe using more fluid from the master cylinder 20 than is otherwise needed. In accordance with the present invention this looseness or floating condition of the pistons in the primary cylinders 32 and 34 is entirely avoided by the provision for transfer of movement of the primary shoe to the secondary shoe.

In the form of the invention shown in FIGURE 2 this means comprises a link 136 of arcuate form extending between the leading edge of the primary shoe 40 and the trailing edge of the secondary shoe 42. The ends of the link 136 are preferably slotted as at 138 to receive the ends of the brake shoes which in the area of contact with the link are curved to accommodate pivotal movement between the parts.

The link 136 has sufficient rigidity to maintain the circumferential spacing between the primary and secondary brake shoes 40 and 42 constant under all operating conditions. Accordingly, in operation the primary and secondary brake shoes will be moved in an equal amount in the same direction and as the piston 80 for the primary shoe is displaced outwardly the piston 82 for the secondary shoe 42 is moved an equal amount inwardly of the chamber 76 thereby maintaining a substantially constant volume of fluid in the pressure chamber 81.

The embodiment of FIGURES 3 and 4 is similar in function to the previously described embodiment. In this embodiment the power cylinder 140, which is straight, is secured by a flange 142 to the support plate or spider 144 of the brake. The ends of the brake shoes 146 and 148 abut buttons 150 and 152 which slidably fit over the ends of a stud 154 extending longitudinally through the cylinder 140 axially thereof.

The power cylinder 140 comprises the compression chamber 156 having an outlet 158 connected to the conduit 48 or 50 of the secondary system, the outlet being also connected to bleeder fitting 159. The compression chamber 156 contains two opposed pistons 160 and 162, which are axially bored to receive the brake shoe connecting stud 154 which is axially slidable relative to the pistons. A spring 164 coiled around the stud 154 normally biases the piston outwardly in opposite directions against lock rings 166 and 168 at the respective ends of chamber 156. Thus, the pistons 160 and 162 are free to move inwardly from the position shown but are locked against outward movement. The usual seals 170 and 172 encircling the buttons 150 and 152, respectively, are provided to prevent entry of dirt and foreign matter into the compression chamber 156. In operation the stud and button assembly 150, 154 and 152 transfers circumferential movement of the primary shoe 146 to the secondary shoe to maintain a constant volume of fluid in the pressure chambers of the primary actuators 32 or 34 in the same manner as the previously described embodiment. It is to be understood that the transfer of circumferential movement is effected without interfering with the development of operating pressure in the chamber 156 for the secondary system. Pressure in this chamber is developed when the leading end of the primary shoe 146 acting on button 150 and stud 154 forces the piston 160 inwardly while the piston at the opposite end of the cylinder 140 is held against outward movement by the lock ring 168 thus effecting a net reduction in the volume of pressure chamber 156. The secondary system is then pressurized and all the brakes are applied simultaneously in the manner described in connection with the embodiment of FIGURE 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A brake system comprising a primary brake having a fixed support member, a pair of brake shoes surrounded by a rotatable drum and mounted for limited radial and circumferential movement with respect to said support, a primary actuator fixed on said support comprising a pair of primary pistons adapted to be moved apart by the pressure of fluid in a chamber to urge said brake shoes into contact with said drum, one of said brake shoes being moved by said drum in the direction of rotation thereof, a secondary brake having an actuator, means positioned between adjacent ends of the brake shoes and within said rotatable drum forming a pressure chamber connected to said secondary brake actuator, a pair of secondary pistons slidably mounted in said pressure chamber, means connecting said one brake shoe to one of said secondary pistons whereby said one secondary piston is moved by said movement of said one brake shoe to pressurize the fluid in said pressure chamber and actuate said secondary brake actuator, and a rigid force transmitting member extending through said secondary pistons and said pressure chamber connecting said brake shoes to transmit the circumferential movement of said one brake shoe to the other brake shoe to eliminate need for additional fluid in said primary actuator.

2. In a wheel brake assembly wherein a pair of relatively movable brake shoes are mounted on a support for limited radial and circumferential movement with respect to said support and surrounded by a relatively rotatable brake drum, service means for oppositely displacing said brake shoes into frictional engagement with said drum comprising a first hydraulic cylinder fixed on said support provided with opposed pistons connected to one end of each of said brake shoes, a second hydraulic cylinder mounted on said support within said brake drum, opposed pistons slidable in said second cylinder and connected to be displaced inwardly of said cylinder by the opposite ends of said brake shoes, respectively, means for limiting outwardly displacement of said pistons, return spring means connected to urge said brake shoes toward said cylinders, said second hydraulic cylinder being actuated only by circumferential displacement of one of said brake shoes when said shoes have been displaced by operation of first hydraulic cylinder into frictional contact with said drum, and rigid force transmitting means extending between said opposite ends of said brake shoes through said second hydraulic cylinder and through said opposed pistons, said force transmitting means being effective, when displaced by said one brake shoe, to move one of said pistons inwardly of said cylinder to pressurize said cylinder and being movable independently of the opposed piston to transfer said circumferential movement of said one brake shoe to the other brake shoe.

3. The combination according to claim 2 together with means for automatically increasing the spacing between the end of the brake shoes connected to the pistons associated with said first hydraulic cylinder to compensate for wear.

4. In a brake system for a vehicle, a relatively stationary support adapted for mounting on an axle or the like, a pair of brake shoes mounted on said support for limited circumferential movement with respect to said support and for radial movement between a disengaged position where they are out of contact with a relatively rotating frictional surface rotating with a ground engaging wheel and a brake applied position where they frictionally engage said surface, a hydraulic service operator mounted on said support and having a pair of pistons operatively connected to one end of each of said shoes, means including an operator controlled primary hydraulic circuit for increasing the fluid pressure within said service operator to move said pistons to thereby urge said brake shoes toward said applied position, return spring means for urging said shoes toward said disengaged position, a hydraulic actuator means mounted on said support between the opposite ends of said brake shoes within the periphery of said frictional surface and so operatively connected directly to said shoes that when said service operator has moved said shoes toward applied position, frictional engagement of at least one of said shoes with said frictional surface will result in essentially circumferential displacement of said engaged shoe with respect to said stationary support sufficient to effect direct operation of said hydraulic actuator means from one of said shoes, a secondary hydraulic circuit independent of said primary circuit operatively connecting said hydraulic actuator means to other brake shoes in said system, adjustment means for increasing the spacing between said brake shoes at said one end thereof to compensate for wear, and means comprising a rigid force transmitting member positioned within the periphery of said frictional surface extending through said hydraulic actuator means and interposed between said opposite ends of said brake shoes for transferring the circumferential movement of said engaged shoe to the other shoe to maintain a predetermined spacing between said pair of pistons.

5. In a wheel brake assembly wherein a pair of relatively movable brake shoes are mounted on a support for limited radial and circumferential movement with respect to a surrounding relatively rotatable brake drum comprising a first hydraulic cylinder on said support provided with opposed service pistons each connected to one end of one of said brake shoes for oppositely displacing said brake shoes into frictional engagement with said drum, said cylinder and said service pistons defining a fluid filled space, said service pistons being mounted for free and unrestricted sliding movement in said cylinder, a second hydraulic cylinder mounted on said support within said brake drum and having opposed pistons connected to the opposite ends of said brake shoes, return spring means connected to urge said brake shoes toward said cylinders, said second hydraulic cylinder being actuated only by circumferential displacement of one of said brake shoes with respect to said support when said shoes have been displaced by operation of said first hydraulic cylinder into frictional contact with said drum, and a rigid force transmitting member positioned within said brake drum and disposed between said opposite ends of said brake shoes and movable independently of the pistons in said second hydraulic cylinder for transferring said circumferential movement of said one brake shoe to the other brake shoe, said service pistons being equally displaced, respectively, inwardly and outwardly throughout the full range of circumferential movement of said brake shoes to thereby maintain a predetermined spacing between said service pistons and maintain the volume of said fluid filled space substantially constant.

6. The combination according to claim 5 wherein said rigid force transmitting member slidably extends through said second hydraulic cylinder and the opposed pistons therein.

7. The combination according to claim 5 wherein said rigid force transmitting member is a link extending between said opposite ends of said brake shoes externally of said second hydraulic cylinder.

References Cited by the Examiner

UNITED STATES PATENTS

| | | | |
|---|---|---|---|
| 1,826,824 | 10/1931 | Reynolds | 188—152 |
| 2,147,082 | 2/1939 | Beusch | 188—140 X |
| 2,382,268 | 8/1945 | Stelzer | 188—152 |
| 2,385,812 | 10/1945 | Hoyt | 188—140 X |
| 3,057,439 | 10/1962 | House et al. | 188—79.5 |

FOREIGN PATENTS

| | | |
|---|---|---|
| 775,896 | 10/1934 | France. |

MILTON BUCHLER, *Primary Examiner.*

EUGENE G. BOTZ, *Examiner.*

ARTHUR L. LA POINT, G. E. A. HALVOSA,
*Assistant Examiners.*